US009654789B1

(12) United States Patent
Kizhepat et al.

(10) Patent No.: US 9,654,789 B1
(45) Date of Patent: *May 16, 2017

(54) SCALABLE REAL-TIME VIDEO COMPOSITING SYSTEMS AND METHODS

(71) Applicant: Vuemix, Inc., Santa Clara, CA (US)

(72) Inventors: Govind Kizhepat, Los Altos Hills, CA (US); Yung-Hsiao Lai, Fremont, CA (US)

(73) Assignee: Vuemix, Inc., Santa Clara, CA (US)

( * ) Notice: Subject to any disclaimer, the term of this patent is extended or adjusted under 35 U.S.C. 154(b) by 190 days.

This patent is subject to a terminal disclaimer.

(21) Appl. No.: 14/789,776

(22) Filed: Jul. 1, 2015

Related U.S. Application Data

(63) Continuation of application No. 13/154,222, filed on Jun. 6, 2011, now Pat. No. 9,077,578.

(51) Int. Cl.
*G06F 15/16* (2006.01)
*H04N 7/12* (2006.01)
*H04N 19/40* (2014.01)
*H04N 21/2365* (2011.01)
*H04N 21/431* (2011.01)
*H04N 21/2343* (2011.01)
*H04N 21/258* (2011.01)

(52) U.S. Cl.
CPC ......... *H04N 19/40* (2014.11); *H04N 21/2365* (2013.01); *H04N 21/234309* (2013.01); *H04N 21/25825* (2013.01); *H04N 21/4312* (2013.01)

(58) Field of Classification Search
CPC ........................... H04N 19/40; H04N 21/2365
USPC ........................... 709/222–236; 375/240–254
See application file for complete search history.

(56) References Cited

U.S. PATENT DOCUMENTS

2002/0172281 A1* 11/2002 Mantchala ....... H04N 21/23412
375/240.12
2012/0320966 A1* 12/2012 Guo ........................ H04N 5/46
375/240.02

* cited by examiner

*Primary Examiner* — Wing F Chan
*Assistant Examiner* — Leon Y Tseng
(74) *Attorney, Agent, or Firm* — Law Office of Andrei D Popovici, PC

(57) ABSTRACT

In some embodiments, a server system composites in real-time, in response to a user video search query, a standard-compliant (e.g. MPEG-4/H.264) SD or HD video stream encoding a rectangular (x-y) composite video preview panel array (grid) of video search results. Each panel/tile in the rectangular panel array displays a temporal section (e.g. the first 90 seconds, looped-back) of a video identified in response to the user query. Generating the composite video panel array in real-time is achieved by compositing the component video panels in the compressed domain, after each panel undergoes off-line a compressed-domain pre-compositing preparation process that facilitates dynamic compositing of the panels into a single video stream. The pre-compositing preparation includes transcoding to a format having a down-scaled common resolution, common GOP structure, and one-slice-per-row slice structure.

12 Claims, 8 Drawing Sheets

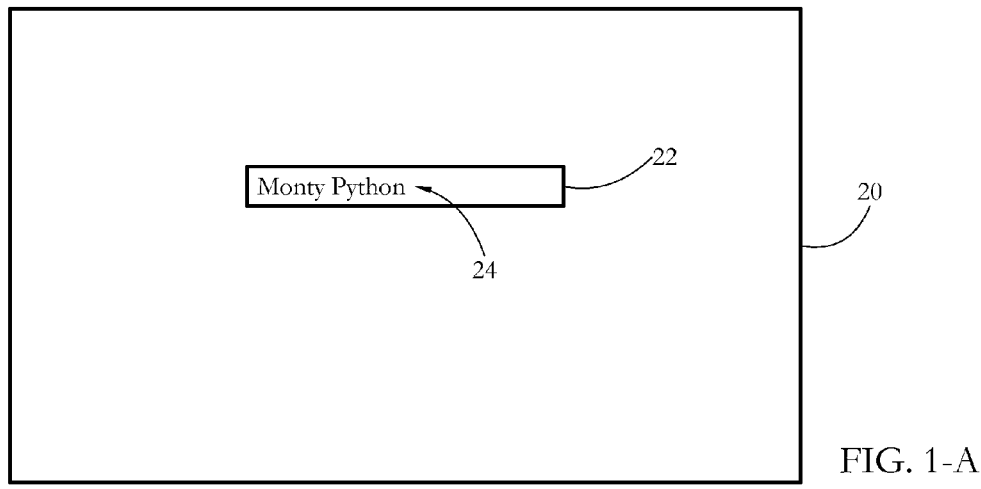
FIG. 1-A
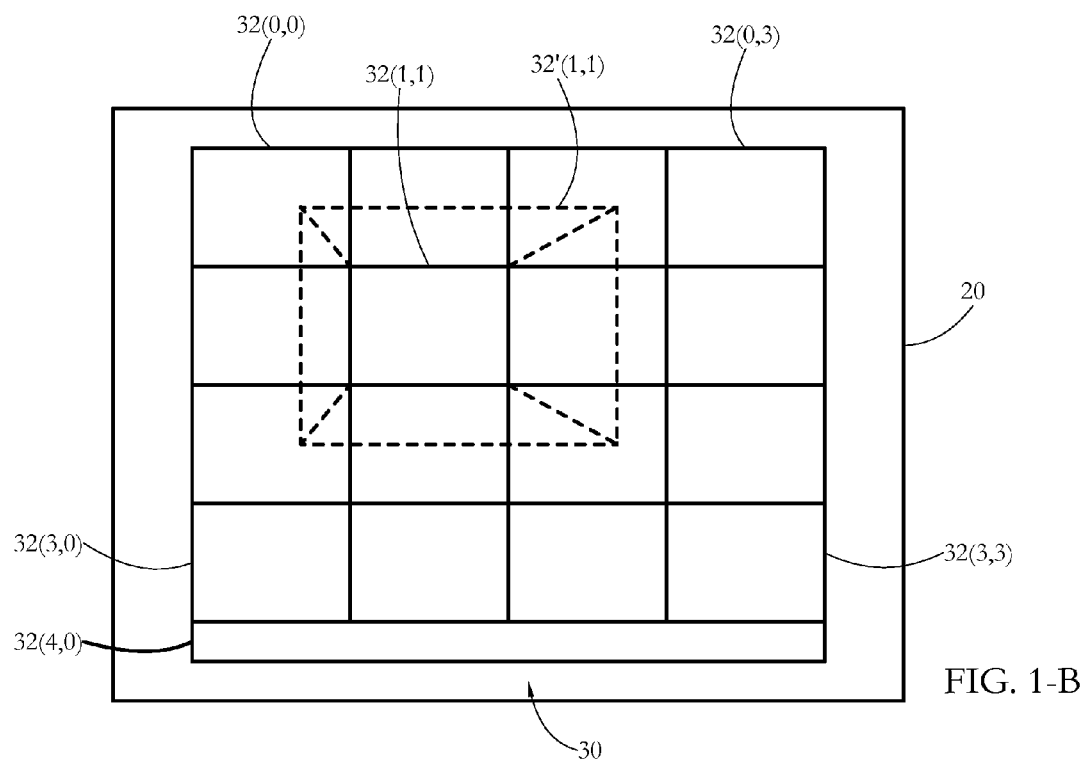
FIG. 1-B

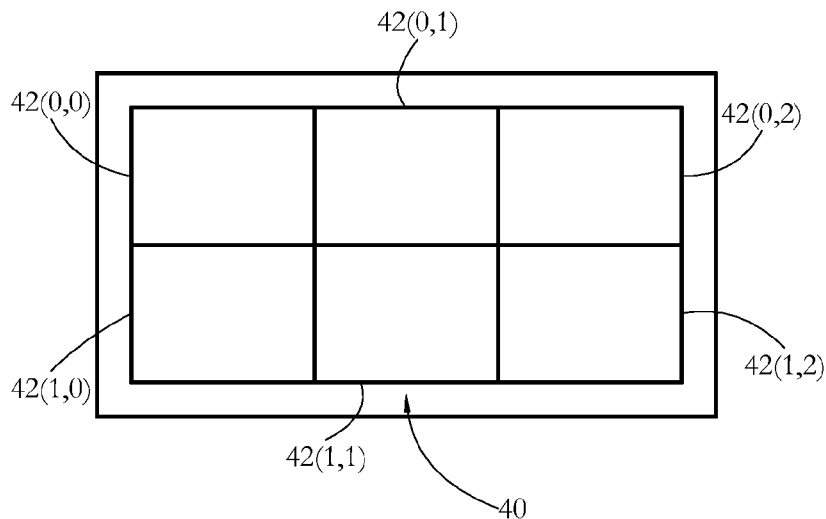
FIG. 1-C
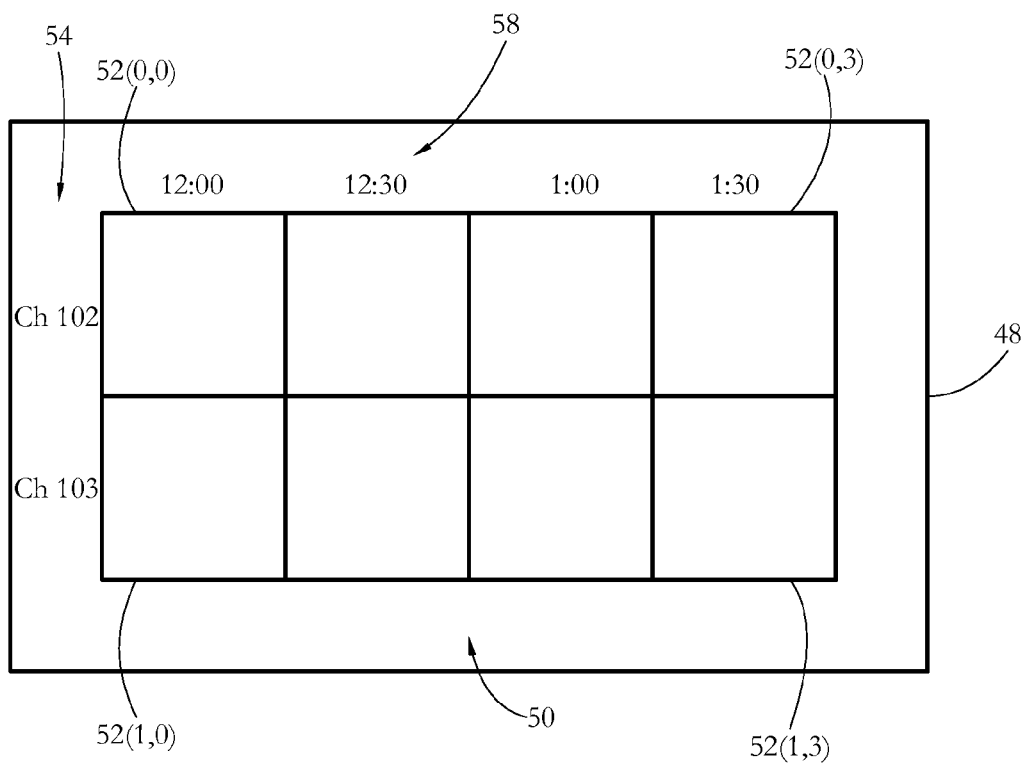
FIG. 1-D

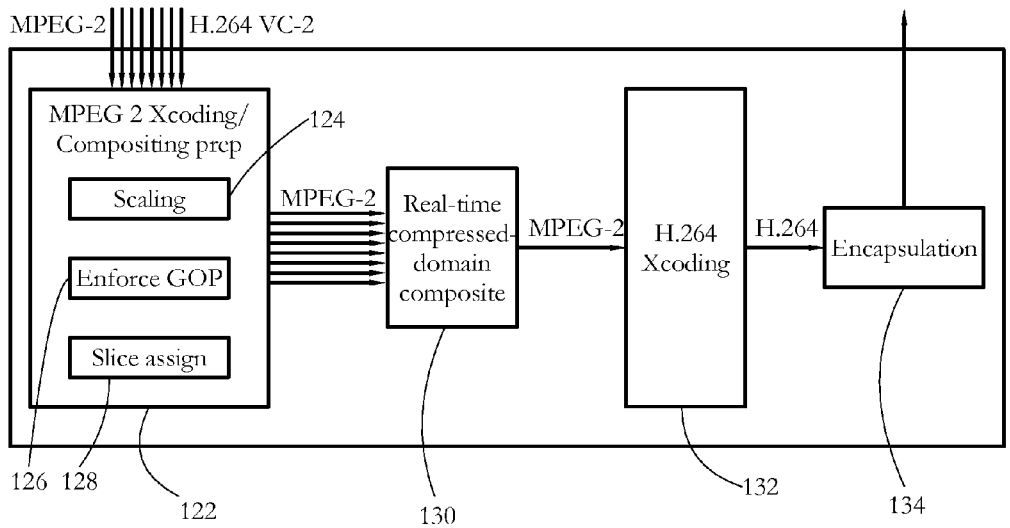
FIG. 5
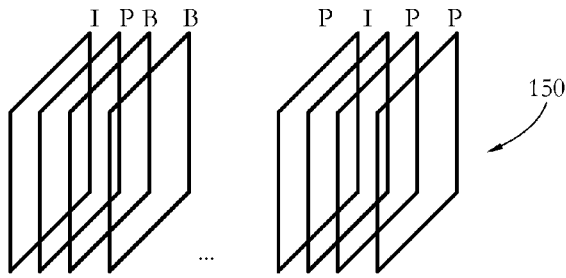
FIG. 6
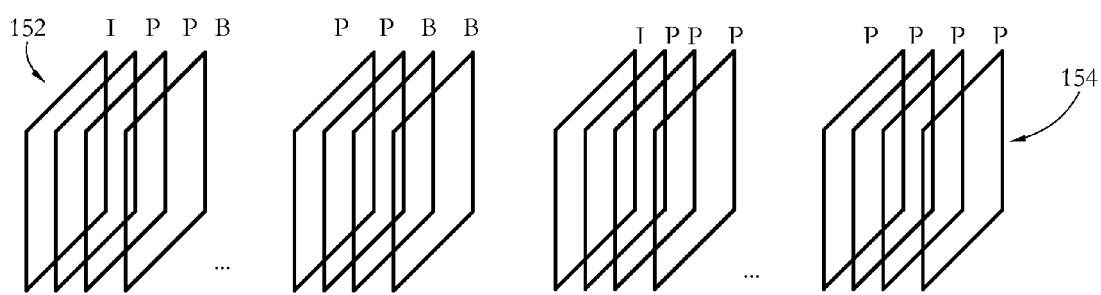

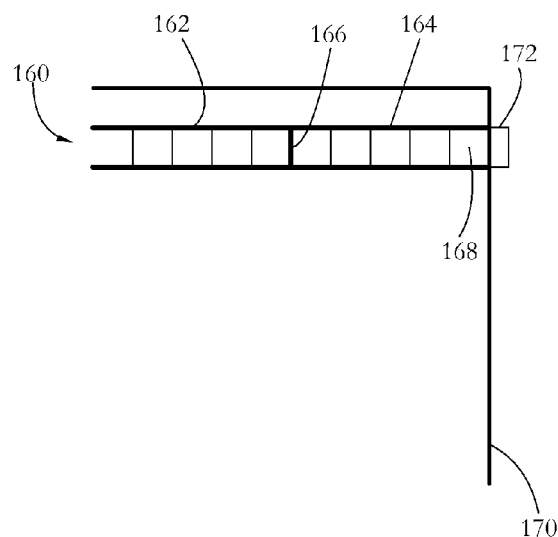
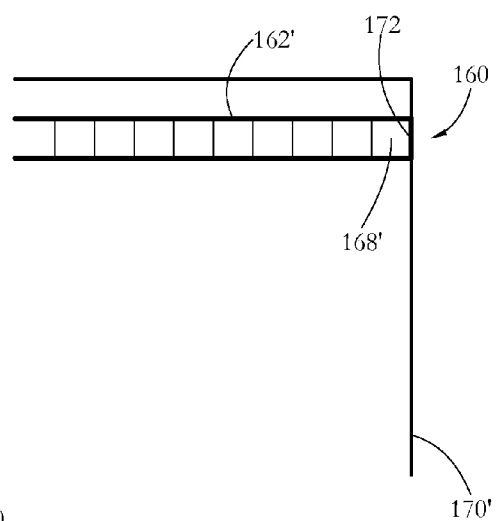
FIG. 7-A  FIG. 7-B
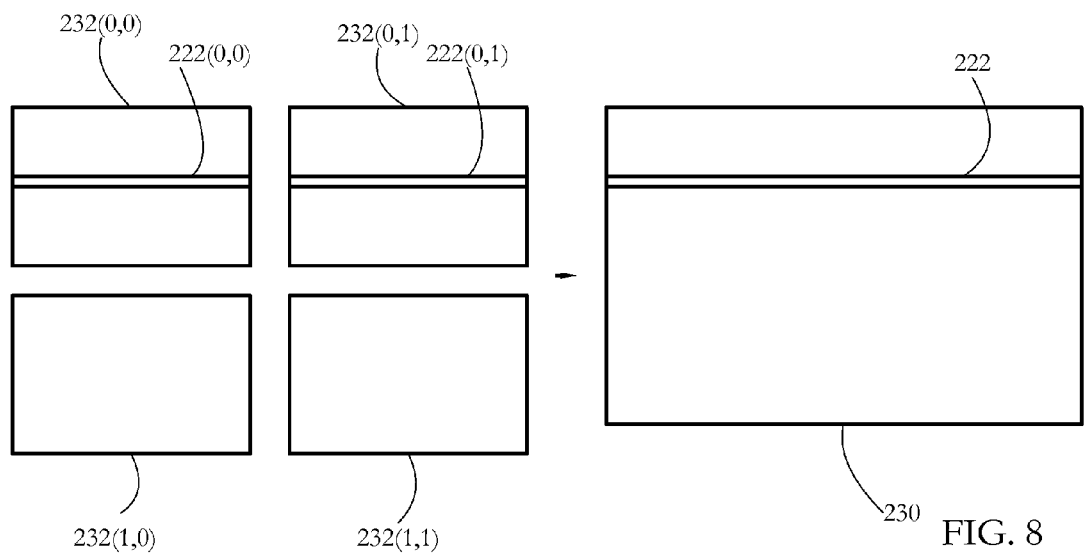
FIG. 8

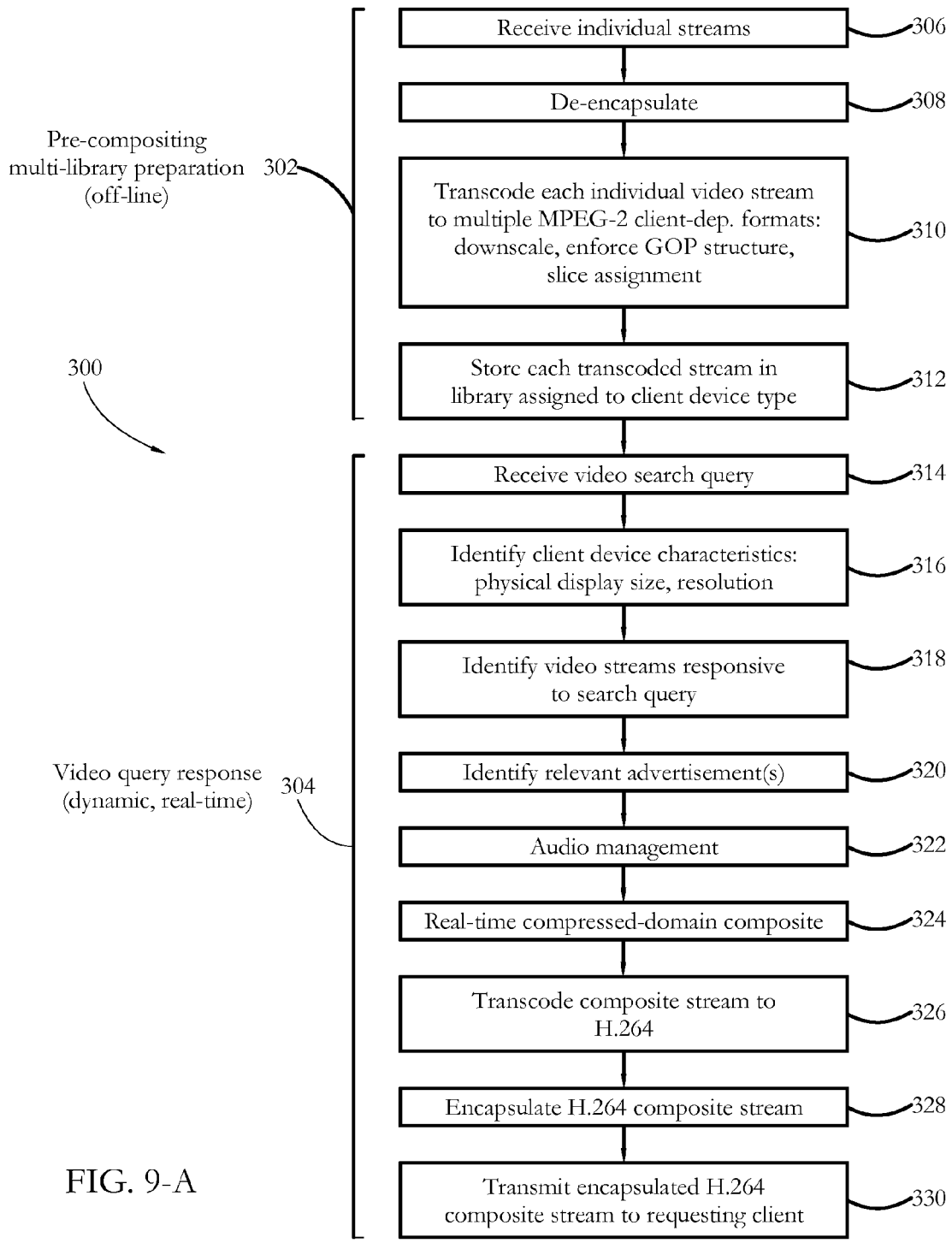
FIG. 9-A

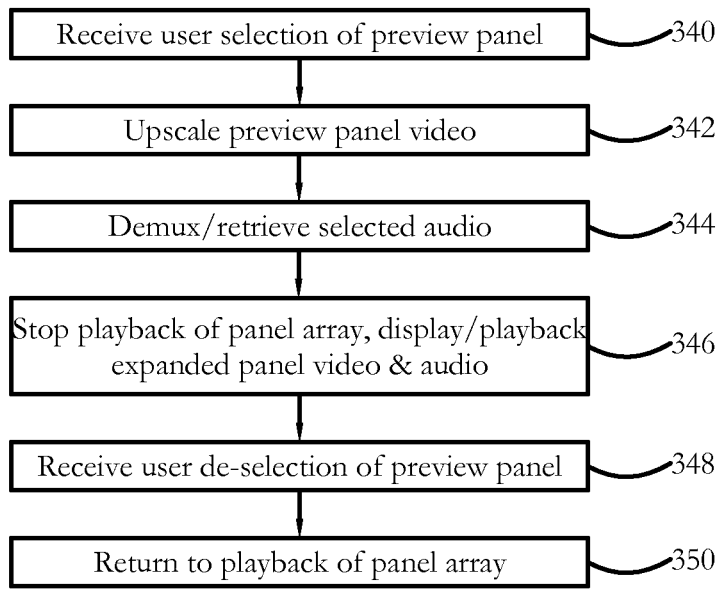
FIG. 9-B
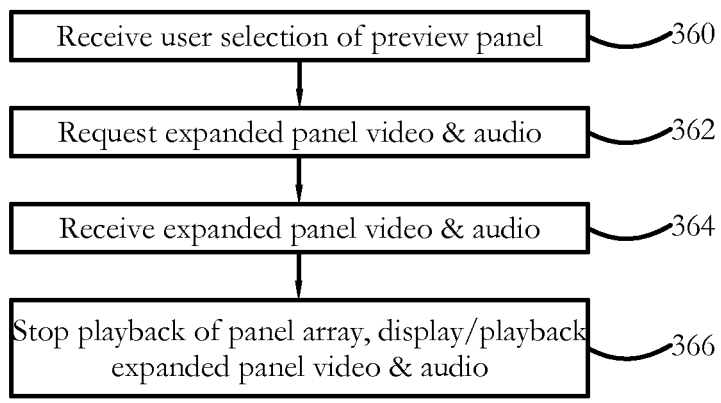
FIG. 9-C

SCALABLE REAL-TIME VIDEO COMPOSITING SYSTEMS AND METHODS

RELATED APPLICATION DATA

This application is a continuation of U.S. patent application Ser. No. 13/154,222, filed Jun. 6, 2011, entitled "Scalable Real-Time Video Compositing Systems and Methods," which is herein incorporated by reference.

BACKGROUND

The invention relates to systems and methods for video encoding, and in particular to systems and methods for displaying video.

Video search results are commonly displayed as a list of still frame thumbnails. Such a list is generated in response to a user text query, and a user may click on one of the thumbnails to start viewing the selected video at a higher resolution.

In U.S. Pat. No. 7,555,718 B2, Girgensohn et al. describe displaying video search results as a collage of keyframes from a story's shots. The selected keyframes and their sizes depend on the corresponding shots' respective relevance.

SUMMARY

According to one aspect, a computer system comprises at least one memory connected to at least one processor configured to: in response to a user video search query, composite a plurality of transcoded video streams in the transform domain into a dynamically-generated composite video stream encoding a preview video panel array responsive to the user video search query, wherein the plurality of transcoded video streams are generated by transcoding a corresponding plurality of independent input video streams, wherein transcoding the plurality of independent input video streams comprises downscaling each of the independent video streams, and enforcing a common group-of-picture (GOP) structure across the plurality of transcoded video streams, wherein a GOP structure of the composite video stream coincides with the common GOP structure of the plurality of transcoded video streams, and transmit the composite video stream for generating a display of the preview video panel array.

According to another aspect, a method comprises employing a computer system comprising at least one memory connected to at least one processor to: in response to a user video search query, composite a plurality of transcoded video streams in the transform domain into a dynamically-generated composite video stream encoding a preview video panel array responsive to the user video search query, wherein the plurality of transcoded video streams are generated by transcoding a corresponding plurality of independent input video streams, wherein transcoding the plurality of independent input video streams comprises downscaling each of the independent video streams, and enforcing a common group-of-picture (GOP) structure across the plurality of transcoded video streams, wherein a GOP structure of the composite video stream coincides with the common GOP structure of the plurality of transcoded video streams, and transmit the composite video stream for generating a display of the preview video panel array.

According to another aspect, a computer system comprises: means for, in response to a user video search query, compositing a plurality of transcoded video streams in the transform domain into a dynamically-generated composite video stream encoding a preview video panel array responsive to the user video search query, wherein the plurality of transcoded video streams are generated by transcoding a corresponding plurality of independent input video streams, wherein transcoding the plurality of independent input video streams comprises downscaling each of the independent video streams, and enforcing a common group-of-picture (GOP) structure across the plurality of transcoded video streams, wherein a GOP structure of the composite video stream coincides with the common GOP structure of the plurality of transcoded video streams, and means for transmitting the composite video stream for generating a display of the preview video panel array.

BRIEF DESCRIPTION OF THE DRAWINGS

The foregoing aspects and advantages of the present invention will become better understood upon reading the following detailed description and upon reference to the drawings where:

FIG. 1-A shows an exemplary user display (e.g. web-browser window) allowing a user to enter a video search query, according to some embodiments of the present invention.

FIG. 1-B shows an exemplary 4×4 video preview panel array formed by compositing 16 preview video panels (tiles), each panel showing one video identified in response to a user query, generated for display on a laptop or desktop computer or television set according to some embodiments of the present invention.

FIG. 1-C shows an exemplary 3×2 video preview panel array formed by compositing 6 preview video panels, each panel showing one video identified in response to a user query, generated for display on a mobile phone according to some embodiments of the present invention.

FIG. 1-D shows an exemplary TV channel listing including a 4×2 video panel array formed by compositing 8 video panels, each panel showing one video corresponding to a program in the channel listing, according to some embodiments of the present invention.

FIG. 5 illustrates a data flow in a video preparation and compositing process according to some embodiments of the present invention.

FIG. 6 illustrates exemplary reference frame dependencies for a video sequence prior to pre-compositing preparation, and after a pre-compositing-preparation tailored to two different client display configurations, according to some embodiments of the present invention.

FIG. 7-A illustrates part of an exemplary video frame prior to compositing into a preview video panel array, according to some embodiments of the present invention.

FIG. 7-B illustrates the part of the frame shown in FIG. 7-A after a pre-compositing preparation for compositing into the preview video panel array, according to some embodiments of the present invention.

FIG. 8 shows an exemplary slice structure before and after compositing into a preview video panel array, according to some embodiments of the present invention.

FIG. 9-A shows a sequence of steps performed by a video server system according to some embodiments of the present invention.

FIG. 9-B shows a sequence of steps performed by a video client system in response to a user selection of a preview video panel according to some embodiments of the present invention.

FIG. 9-C shows a sequence of steps performed by a video client system in response to a user selection of a preview video panel according to some embodiments of the present invention.

DETAILED DESCRIPTION OF PREFERRED EMBODIMENTS

Figure 2:
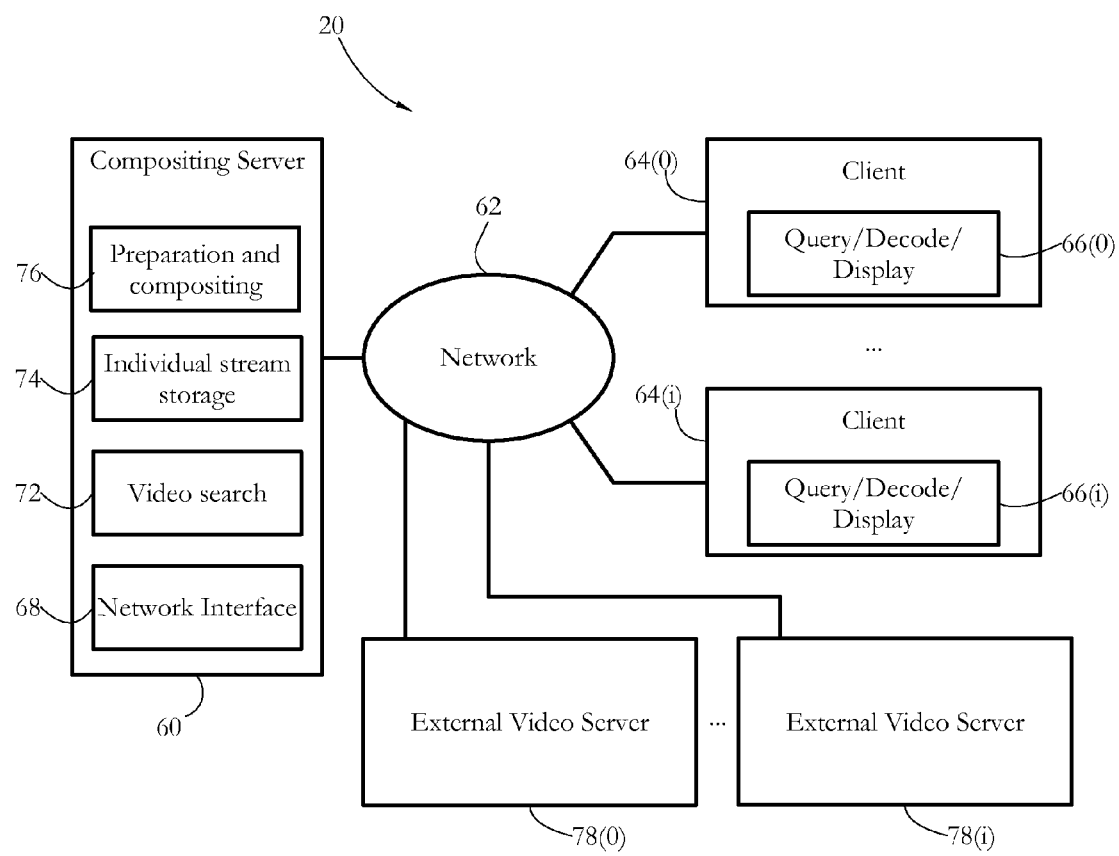
FIG. 2 illustrates an exemplary video search, encoding and delivery computer system environment according to some embodiments of the present invention.

In the following description, it is understood that all recited connections between structures can be direct operative connections or indirect operative connections through intermediary structures. A set of elements includes one or more elements. Any recitation of an element is understood to refer to at least one element. Unless otherwise required, any described method steps need not be necessarily performed in a particular illustrated order. A first element (e.g. data) derived from a second element encompasses a first element equal to the second element, as well as a first element generated by processing the second element and optionally other data. Unless otherwise specified, the term "program" encompasses both stand-alone programs and software routines that form part of larger programs. Making a determination or decision according to a parameter encompasses making the determination or decision according to the parameter and optionally according to other data. Unless otherwise specified, the terms "rectangle" and "rectangular" encompass both rectangles with equal sides (i.e. squares) and rectangles with unequal sides. Unless otherwise explicitly stated, the term "compositing" is used below to refer to spatial compositing, i.e. generating a composite video including multiple side-by-side video components, as distinguished from the temporal concatenation of multiple videos one-after-the-other. The terms "compressed domain" and "transform domain" refer to data that has undergone a transformation to the frequency domain, such as through application of a DCT, Hadamard or similar transform to pixel-domain data; compositing in the transform domain refers to compositing transform-domain data, and does not encompass compositing pixel-domain data followed by transformation into the transform domain. Unless otherwise specified, an indicator of some quantity/data may be the quantity/data itself, or an indicator different from the quantity/data itself. Unless otherwise specified, the term "logic" encompasses both special-purpose hardware and one or more programmable microprocessors configured to execute software instructions. Computer readable media encompass storage (non-transitory) media such as magnetic, optic, and semiconductor media (e.g. hard drives, optical disks, flash memory, DRAM), as well as communications links such as conductive cables and fiber optic links. Provided herein are non-transitory computer-readable media encoding instructions which, when executed by a computer system, cause the computer system to perform the operations described below, as well as logic configured to perform the operations described below.

The following description illustrates embodiments of the invention by way of example and not necessarily by way of limitation.

FIG. 1-A shows an exemplary user display 20 allowing a user to enter a video search query 24 in a text entry area/box 22, according to some embodiments of the present invention. The search query may be a user-generated text string 24, as shown in FIG. 1-A. The search query may also be a selected pre-defined query, such as a query requesting relevant videos for the top news stories of the day for a particular user, movie trailers of the day, or top football or sports highlights of the hour. Display 20 may be a web browser or other software application window displayed on a user desktop, laptop, tablet, or mobile phone device. In some embodiments, display 20 may be a user interface display generated on a user's television set by a dedicated TV converter or video player device.

FIG. 1-B shows an exemplary rectangular composite interactive video preview panel (tile) array 30 formed by spatially-compositing (stitching) sixteen (4×4) rectangular video preview panels 32(0,0) . . . 32(3,3) and an exemplary supplementary panel 32(4,0) shaped as a horizontal band. A composite video panel array may include lower or higher numbers of panels than shown in FIG. 1-B. For example, a composite video panel array as described below may include 4 (e.g. 2×2), 6 (3.g. 3×2) or 48 (e.g. 8×6) panels. In some embodiments, a server chooses the size of the panel array according to a configuration of the requesting client, and in particular according to a physical display size of the requesting client. For example, a 4×4 panel array may be chosen for displays larger than 15" in diagonal (e.g. laptop and/or desktop displays), and a 3×2 array for tablet, netbook, and mobile phone displays (e.g. displays less than 15" in diagonal). In some embodiments, a 3×2 array may be used for tablets and netbooks (e.g. displays 5-15" in diagonal), and a 2×2 array for mobile phone displays (e.g. displays of less than 5" in diagonal).

In some embodiments, each panel 32(0,0)-32(3,3) shows one video identified in response to a user query submitted using a graphical user interface such as the one shown in FIG. 1-A, while supplementary panel 32(4,0) shows an advertising video, which may be selected in response to the user query. In the illustrated embodiment, video panels 32(0,0) . . . 32(4,0) are immediately adjacent, i.e. there is no space between neighboring panels. In some embodiments, neighboring panels may be separated by static lines/strips. Video panel array 30 is encoded and decoded as a single standard-compliant (e.g. H.262/MPEG-2 or H.264/MPEG-4 Part 10) SD or HD video stream, and panels 32(0,0) . . . 32(4,0) display simultaneously-playing videos. In some embodiments, each panel in array 30 plays a predetermined part of its corresponding video, for example the first 10, 30 of 90 seconds (optionally looped back) of each corresponding video.

In some embodiments, the computer system displaying preview panel array 30 is configured to receive user input indicating a selection of one of the video panels for playback. The user may indicate his or her selection using an input device such as a mouse or trackpad, by hovering over and/or clicking on a selected panel. In some embodiments, upon receiving a user selection of one of the video panels, the computer system selects an audio stream corresponding to the selected video panel and plays the selected audio, without changing the video played by preview panel array 30; no audio is played prior to receiving a user selection.

In some embodiments, a user selection of a given video preview panel results in the selected video being zoomed to the size of array 30 or another area larger than the corresponding preview panel. For example, an expanded panel 32'(1,1) may be displayed in response to receiving a user input indicating a user selection of an original preview panel 32(1,1). The user input may be a mouse or touchpad input hover over the preview panel for a predetermined period of time. Expanded panel 32'(1,1) shows the video sequence of original preview panel 32(1,1), scaled appropriately. Playback may be paused for the non-selected video panels (i.e. for video panel array 30 as a whole) while expanded panel 32'(1,1) plays its content. In some embodiments, the data for expanded panel 32'(1,1) is generated on the client side, by extracting and upscaling the appropriate macroblocks out of the video stream for panel array 30. In some embodiments, the data for expanded panel 32'(1,1) may be generated on the server side, and a user selection of preview panel 32(1,1) results in a client request and server transmission of a new video stream containing the data of expanded panel 32'(1,1).

FIG. 1-C shows an exemplary rectangular composite video preview panel (tile) array 40 formed by spatially-compositing six (3×2) rectangular video preview panels 42(0,0) . . . 42(1,2). Array 40 may be generated in response to a request by a client having a smaller display, such as a netbook, tablet or mobile phone client.

FIG. 1-D shows an exemplary TV channel listing display 48 including a 4×2 video panel array 50 formed by compositing video panels (tiles) 52(0,0) . . . 52(1,3). Each panel shows one video corresponding to a program in the channel listing. Display 48 may include row and column text areas such as a channel name column 54 and a program time row 58 situated adjacent to video panel array 50 and providing labels to the different tiles of video panel array 50. Display 48 may be a user interface display generated on a user's television set by a dedicated TV converter or video player device. In some embodiments, display 48 may be a web browser or other software application window displayed on a user desktop, laptop, tablet, or mobile phone device.

FIG. 2 illustrates an exemplary video search, compositing and delivery computer system environment according to some embodiments of the present invention. A video server system 60 is connected to a plurality of client computer systems 64(*i*) and external video server systems 78(*i*) over a wide area network 62 (a network including at least one router) such as the Internet. In some embodiments network 62 may include a cable TV or satellite TV distribution network, or a local area network such as an enterprise or home network. Each client computer system 64(*i*) runs corresponding video search query, video decode and video display application(s) 66(*i*) as illustrated above, which may be provided as part of a browser and/or as one or more standalone native applications. A video search query application receives user input including a video search query in text or other form (e.g. a user selection of an option). A composite preview video panel array stream received in response to the video search query is then decoded and displayed to the user using decode and video display application(s). External video servers 78(*i*) are configured to deliver requested individual videos to video server system 60, for pre-compositing preparation and storage in a local library of video server system 60.

Server system 60 includes a network interface subsystem 68, a video search subsystem 72, an individual stream storage subsystem 74, and a video preparation and real-time compositing subsystem 76. In some embodiments, the various subsystems of server system 60 may be implemented by different hardware and/or physical servers. For example, one or more distinct physical servers may be used for each of video search subsystem 72, individual stream storage subsystem 74, and video preparation and compositing subsystem 76. Moreover, in some embodiments, one or more distinct physical servers may be used to implement video preparation and compositing subsystem 76.

Network interface subsystem 68 is used to communicate with client computer systems 64(*i*) and external video servers 78(*i*) over network 62. In particular, client interface subsystem 68 receives video search queries and/or other user input from client computer systems 64(*i*), and in response sends to the requesting client computer systems 64(*i*) composite video streams responsive to the received user input. In response to receiving a user video search query and information on the client display hardware from a client computer system 64(*i*), server system 60 uses video search subsystem 72 to identify individual independent video streams (videos) responsive to the query. The client display hardware information is used identify a corresponding video library or sublibrary for that client hardware (e.g. laptop/desktop, netbook/tablet, or mobile phone library). The video search query is used to identify relevant streams within the library/ies according to text metadata associated with the streams. In some embodiments, one or more relevant video advertisements may also be identified, for display together with the relevant video streams.

Storage subsystem 74 is used to retrieve the identified preview videos from a library or libraries of stored videos. In some embodiments, a single preview video resolution (or pixel density) is used across client display hardware configurations, and a single version is maintained by storage subsystem 74 for each preview video. In some embodiments, different preview panel resolutions are used for different client display hardware configurations. Separate versions of each preview video may then be maintained in corresponding libraries by storage subsystem 74, with each version having a resolution chosen according to the size of the preview panel array corresponding to an associated display hardware configuration. For example, preview panel videos having a resolution of 304×192 may be stored in a mobile device library, while higher resolution versions may be stored in netbook/tablet and desktop/laptop libraries.

Video preparation and compositing subsystem 76 prepares for compositing videos received in various formats from external sources, for example from external video servers 78(*i*), and in response to a user query composites multiple individual video streams together in a down-scaled form into a single standard-compliant preview video stream. As preparation for compositing, individual streams are transcoded in a way that facilitates real-time compositing of a relatively high number of video streams, described in detail below. Each composite video stream is delivered to the requesting client 64(*i*) over network 62. Client 64(*i*) decodes and displays the composite preview video stream as a single video.

Figure 3:
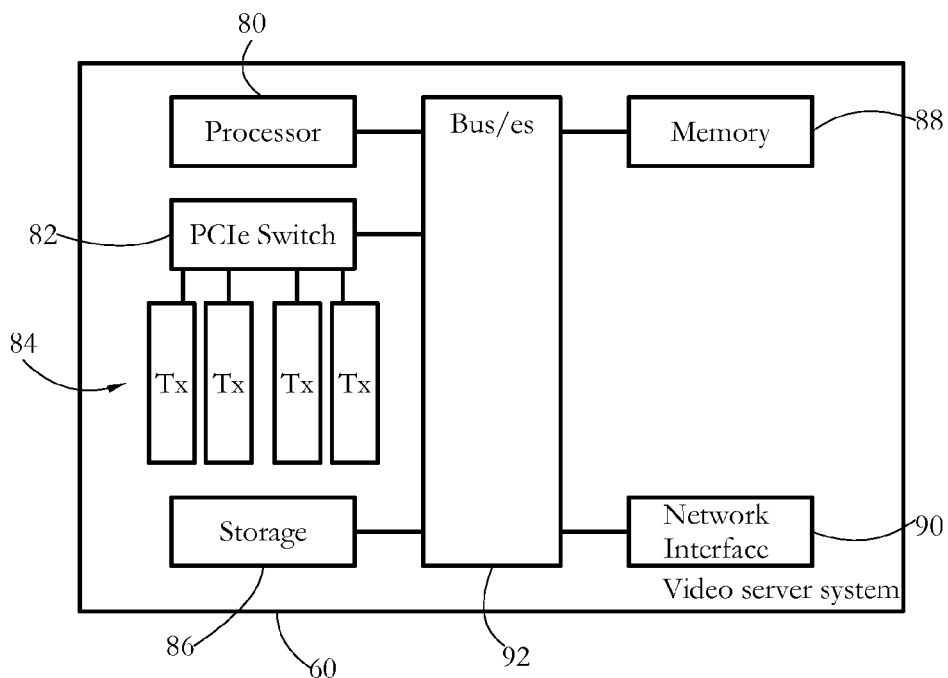
FIG. 3 illustrates an exemplary video server system hardware configuration according to some embodiments of the present invention.

FIG. 3 illustrates an exemplary hardware configuration for server 60 according to some embodiments of the present invention. In some embodiments, similar hardware configurations may be employed for each server subsystem illustrated in FIG. 2, with appropriate modifications (e.g. server subsystems not used for video preparation or compositing may not need to make use of special-purpose transcoding hardware). Server 60 may be a 1U (one rack unit) server including one or more transcoder cards holding a number of special-purpose transcoder integrated circuits (chips), and a general-purpose processor configured to execute software as described below. Server 60 includes a plurality of components interconnected through a bus or buses 92: a general-purpose processor (CPU) 80, a plurality of special-purpose transcoder integrated circuits 84 connected to bus/es 92 through a switch/bridge 82, an audio/video storage device 86, a memory 88, and a communications interface (e.g. network interface card) 90. Storage device 86 may include an array of hard disk drives. Switch/bridge 82 may be a PCI-Express (PCIe) switch, such as one available from PLX Technology, Inc. in Sunnyvale, Calif. Transcoder integrated circuits 84 may be commercially-available integrated circuits such as transcoders available from Magnum Semiconductor, Inc., Milpitas, Calif., Zenverge, Inc., Cupertino, Calif., or ViXS Systems, Toronto, Canada. In an exemplary configuration, server 60 may include two PCIe cards each having one PCIe switch 82 and fifteen transcoder integrated circuits, for a total of 30 transcoder chips per 1U server. Consider an exemplary transcoder in the 51xx series available from ViXS Systems. Such a transcoder is capable of simultaneous transcoding of up to 8 standard-definition (SD) streams between MPEG-2, H.264 and VC-1 formats, corresponding to about 2 high-definition (HD) streams, or about 8 or more conversions from SD to a lower preview resolution (e.g. 304×192).

Figure 4:
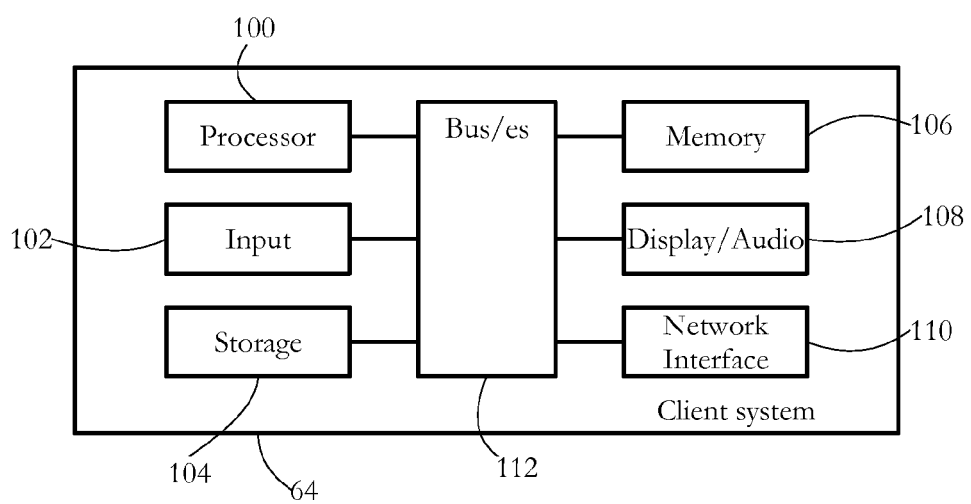
FIG. 4 illustrates an exemplary client system hardware configuration according to some embodiments of the present invention.

FIG. 4 illustrates an exemplary hardware configuration for a client system 64 according to some embodiments of the present invention. System 64 includes a general-purpose processor (CPU) 100, one or more user input devices 102 for receiving user input, a storage device 104, a memory 106, audio/video output device(s) 108 (e.g. display and speakers), and a communications interface (e.g. network interface card) 110, all interconnected through a bus or buses 112. Client system 64 is capable of generating a user display showing a composite video as described below.

FIG. 5 shows a flow of data in a video preparation and compositing process according to some embodiments of the present invention. A compositing-preparation transcoding process 122 transforms a plurality of independent input videos having various different resolutions and encoding formats (e.g. MPEG-2, H.264, VC-1, VC-2) into a corresponding plurality of MPEG-2 preview videos having a common resolution, GOP structure, and one-slice-per-row slice structure. Transcoding to such a format facilitates real-time compositing of any arrangement of such preview videos, and thus the real-time generation of a single, dynamically-constructed composite video stream including multiple preview videos identified in response to a user video query. The input videos may be received from a local library or from an external video server in response to a user query. Prior to transcoding, a video and associated audio received from an external video server may be de-encapsulated from a multimedia container (wrapper) format such as MPEG-2 Transport Stream (MPEG-TS), QuickTime File Format, MP4, Flash Video (FLV), Audio-Video Interleave (AVI), 3GP, or RealMedia (RM). Transcoding process 122 may be performed off-line to yield multiple prepared video libraries, each library corresponding to a client device hardware configuration, capable of supplying videos prepared for real-time compositing into a preview panel array having video panels identified dynamically in response to a user query. In some embodiments, transcoding process 122 may be performed dynamically, in response to a user query, for at least some of the videos to be composited, if such videos have not already been prepared for compositing and are not present in the stored library/ies.

Transcoding process 122 may be performed by a commercially-available transcoder integrated circuit as described above, configured with appropriate configuration settings as described herein. Transcoding process 122 may be performed by fully decoding each input stream to the pixel domain, and re-encoding the resulting data in an MPEG-2 format using a predetermined resolution and GOP structure. Such a transcoding process may include a scaling step 124, a GOP structure setting step 126, and a slice assignment step 128.

Scaling step 124 sets the resolution of each output stream to a common preview panel scaled resolution, which is predetermined for a given client device hardware configuration as described above. The common scaled resolution reflects the resolution and layout of the composite video stream, including the number and arrangement of individual component video streams included in the composite video stream. Appropriate scaling may be performed by encoding the decoded pixel data at the desired common scaled output resolution.

GOP structure setting step 126 includes setting the GOP structure of the preview videos to a common GOP structure, which is predetermined for a given client device hardware configuration as described above. A desired common GOP structure may be enforced by setting the frame types used during the encoding process according to the desired GOP structure. In some embodiments, the desired GOP structure is predetermined for a given client device hardware configuration, and is independent of the GOP structures of the input videos. For example, such a predetermined GOP structure may be IPPBBBPPBBB . . . for client devices capable of decoding B frames, and IPPPPPP . . . for devices (such as some mobile devices) which are not ordinarily capable of decoding P frames. FIG. 6 shows an exemplary GOP structure 150 of an input frame sequence, and exemplary common GOP structures 152, 154 resulting from the transcoding of the input frame sequence to formats corresponding to two different client device hardware configurations. All frame types are shown in display order. Common GOP structure 152 is used as the output GOP structure for all preview videos generated for a given type of client hardware, regardless of the particular GOP structure 150 of the input video. Consequently, other preview videos to be composited with the transcoded video of interest will have the same output GOP structure. Similarly, common GOP structure 154 is used as the output GOP structure for all preview videos generated for its corresponding type of client hardware, regardless of the GOP structure 150 of the input video.

Slice assignment step 128 includes encoding the decoded pixel data using a one-slice-per-row slice structure. Prior to decoding from a format such as H.264, VC-1 or VC-2, the input video data may have included assignments of more than one row of video blocks per slice. Appropriate slice assignment may be performed by a transcoder set to encode to an MPEG-2 format. Video blocks (e.g. macroblocks, which are 16×16 blocks) are assigned to slices so as to yield a one-slice-per-row slice structure for each stream.

FIG. 7-A illustrates part of an exemplary video frame 170 prior to pre-compositing preparation, according to some embodiments of the present invention. Frame 170 may be encoded according to the H.264/MPEG 4 Part 10 standard. As shown, a row of macroblocks (16×16 blocks) 162 may include all or parts of two different slices 162, 164, which are separated by an inter-slice boundary 166. Each slice 162, 164 may include video blocks from multiple rows. A macroblock contains coded data corresponding to 16×16 sample region of the video frames. The samples may include 16×16 luminance (luma) samples, and 8×8 chrominance (8×8 Cb and 8×8 Cr) samples. In addition to the coded transform coefficients representing encoded video data, each macroblock may include data on parameters such as macroblock type (e.g. I/Intra, P/Predicted, B/Bi-Predicted, macroblock partition size), macroblock predictions (intra prediction modes, list 0 and list 1 references and differentially coded motion vectors), sub-macroblock predictions, coded block patterns, and quantization parameter, among others. Each slice contains an integer number of macroblocks, up to the total number of macroblocks in the frame (one slice per picture). Each slice includes its own slice header, which includes information such as the type of slice, the coded picture the slice belongs to, and instructions related to reference picture management. In some embodiments, the types of slice may be I (Intra), P (Predicted), B (Bi-predictive), SP (Switching P) and SI (Switching I). As shown in FIG. 7-A, a frame edge macroblock 168 may include motion vectors referencing a virtual data area 172 extending beyond the frame boundary. The virtual data area 172 may be an 8-pixel-wide area which duplicates the adjacent, right half of edge macroblock 168.

FIG. 7-B illustrates the part of the frame shown in FIG. 6-A after a transcoding operation that has aligned slices to rows and eliminated motion vectors referencing virtual areas, according to some embodiments of the present invention. A post-transcoding slice 162' coincides with its corresponding row 160, as illustrated by the slice end boundary 172, which coincides with the row end. In addition, edge macroblock 168' does not reference a virtual area outside slice 162'.

As shown in FIG. 5, a real-time video compositing step 130 composites multiple MPEG-2 preview video streams into a composite MPEG-2 intermediate video stream that can be used to generate a composite display such as the displays 30, 40, 50 shown in FIGS. 1-B-C-D. Compositing step 130 is performed in the compressed (transform) domain in real-time in response to a user query identifying the specific videos to be composited. Compositing step 130 may be performed using compositing software running on CPU 80 (FIG. 3). Compositing step 130 is relatively fast and scalable because of the pre-compositing preparation steps described above, and particularly because the compositing is performed in the compressed (transform) domain and thus does not involve time-consuming transformations between the pixel and the transform (frequency) domains or other computationally-intensive decoding/encoding steps.

The compositing operations performed according to some embodiments may be understood better by considering FIG. 8. FIG. 8 shows an exemplary slice structure before and after compositing multiple pictures 232(0,0)-232(1,1), each selected from a corresponding preview video, into a composite video panel 230, according to some embodiments of the present invention. Consider an exemplary row of macroblocks 222 in the composite panel 230, which displays the data of corresponding rows of macroblocks 222(0,0), 222(0,1) in component frames 232(0,0), 232(0,1), respectively. Each component row has been prepared, pre-compositing, to be encoded precisely as one slice. Post-compositing, the entire row of macroblocks 222 may be encoded as a single slice. The compositing process renumbers the macroblocks in the component frames other than the left-most frame and replaces the two individual slice headers for rows 222(0,0), 222(0,1) with a single slice header for row 222. If the left-most frame includes 16 macroblocks, macroblock renumbering includes incrementing by 16 the macroblock index for each macroblock in the second frame from the left edge. Corresponding adjustments are made for the macroblock indexes in subsequent frames. The compositing process otherwise leaves unchanged the transform-domain video residual data for the macroblocks of row 222. In some embodiments, the compositing process may yield a composite image that includes multiple slices per row, with inter-slice boundaries within each row being defined by the boundaries of the component video panels forming the composite panel array.

As shown in FIG. 5, an output transcoding step 132 transcodes the MPEG-2 intermediate video stream into an H.264 (or in some embodiments MPEG-2) output stream suitable for display/playback on the requesting client device. The H.264 output stream may include slices encoding multiple rows of video blocks. Transcoding step 132 may be performed by hardware transcoders 84 (FIG. 3). In some embodiments, output transcoding step 132 may be performed according to an indicator of the client system's decoding capabilities. For example, the intermediate video stream may be transcoded to an MPEG-2 format having a one-slice-per-row slice structure if the client system is capable of decoding MPEG-2 video, and to an H.264 format otherwise, or if the client system is capable of decoding H.264 video and not capable of decoding MPEG-2 video.

An encapsulation step 134 (FIG. 5) encapsulates the output H.264 video stream in a desired multimedia container format. Encapsulation step 134 may be performed by software running on CPU 80 (FIG. 3). The resulting encapsulated audio/video stream is sent to the requesting client system through network interface 90 (FIG. 3).

In some embodiments, an audio stream corresponding to a user-selected preview panel is retrieved from server 60 only in response to a user selection (e.g. clicking) of a preview panel. A composite stream is initially delivered to the client device without associated audio. When the client device receives a user input indicating a selection of a preview panel, the client device sends to server 60 an audio stream request identifying the selected preview panel, and an audio stream corresponding to the selected preview video is added by server 60 to the multimedia container used to stream the composite preview video. The audio stream is then played-back by the client device in a conventional manner.

In some embodiments, multiple compressed audio streams/channels are sent alongside each composite video, and one audio stream corresponding to a user-selected preview panel is identified from the collection of received audio streams on the client device, and played back, in response to a user selection (e.g. mouse click on the selected video panel). For example, for the 4×4 video panel array 30 shown in FIG. 1-B, 16 audio streams are sent by server 60 alongside the composite video stream for video panel array 30. For the 3×2 video panel array 40 shown in FIG. 1-C, 6 audio streams are sent. In such embodiments, transcoder hardware such as transcoders 84 shown in FIG. 3 may be used to downconvert individual audio streams corresponding to each video panel to a common bitrate, e.g. 64 kbps.

FIG. 9-A shows an exemplary sequence of steps 300 performed by server system 60 according to some embodiments of the present invention. A set of compositing-preparation steps 302 may be performed offline to generate a plurality of compositing-ready multimedia (audio/video) libraries, each corresponding to a client device hardware configuration. A set of compositing and delivery steps 304 are performed dynamically, in real-time at 30 fps, in response to receiving a user video search query.

In a step 306, server 60 receives individual multimedia (audio/video) streams each corresponding to a different independent video (story). The streams may be received from external video servers 78(i) (FIG. 2). A sequence of steps 308, 310, 312 (FIG. 9-A) are used to generate multiple compositing-ready versions of each received video stream, which are stored in corresponding client-device-specific libraries. In a step 308, the received video stream is de-encapsulated. In a step 310, server 60 uses hardware transcoders 84 to transcode the video from its input format (e.g. MPEG-2, H.264, VC-1 or VC-2) into each compositing-ready MPEG-2 format corresponding to a client device hardware configuration (e.g. desktop/laptop, netbook/tablet, mobile device). The transcoding step includes downscaling to a common resolution, enforcing a common GOP structure predetermined for the client device hardware configuration, and re-assigning video blocks to slices to enforce a one-slice-per-row slice structure. In a step 312, each transcoded stream is stored, alongside its audio (original or transcoded to a desired bitrate), in a library corresponding to a client device hardware configuration.

In a step 314, server system 60 receives a video search query from a client system. In step 316, server 60 identifies relevant client device characteristics from information transmitted by the client. Such client device characteristics may include physical display size, display resolution, and supported video decoding formats/modes (e.g. whether the client device is capable of supporting a given container format and/or GOP structure/frame types). In a step 318, server 60 identifies videos streams responsive to the user search query. Such video streams may be retrieved from the library corresponding to the client device hardware configuration, and/or from external servers 78(i). In a step 320, one or more advertisements relevant to the user query and/or user account are identified. In a step 322, a number of audio stream management operations are performed. In some embodiments, server 60 assembles and sends all audio streams and associated synchronization data corresponding to a preview panel array to the requesting client. In a step 322, server 324 composites the compositing-ready MPEG-2 video panels into a single intermediate composite MPEG-2 stream. The intermediate MPEG-2 stream is transcoded to H.264 using hardware transcoders 84 (step 326). The transcoded composite video stream may include slices comprising more than one row of video blocks. The H.264 output video is encapsulated by itself or alongside one or more associated audio streams (step 328), and transmitted to the requesting client 330.

FIGS. 9-B-C show a number of steps performed in response to a user selection of a video panel, which may be used to generate an expanded preview video panel such as the panel 32'(1,1) shown in FIG. 1-B, according to some embodiments of the present invention. FIG. 9-B shows a sequence of steps performed by a video client system 64(i) in response to a user selection of a preview video panel in a composite preview video panel array according to some embodiments of the present invention. In a step 340, the client receives a user selection of a video preview panel. In a step 342, the client generates an expanded panel, a higher-resolution version of the selected preview video. In a step 344, an audio stream corresponding to the selected video panel is requested from server 60, or alternatively retrieved from a plurality of streams received from server 60. In a step 346, the client stops playback of the video panel array stream, and initiates the display/playback of the expanded panel. Upon receiving a user de-selection of the selected preview panel (e.g. a click on the expanded panel) (step 348), the client stops the playback of the expanded panel and returns to playing the video panel array stream (step 350).

FIG. 9-C shows a sequence of steps performed by a video client 64(i) in response to a user selection of a preview video panel in a composite preview video panel array according to some embodiments of the present invention. Upon receiving an indicator of a user selection of a given preview panel from a video panel array (step 360), client 64(i) requests from server 60 an expanded panel video stream and associated audio (step 362). Client 64(i) receives the expanded panel video and associated audio from server 60 (step 364), and stops the playback of the panel array and displays/plays back the expanded panel video and associated audio (step 366). The steps 348, 350 described above may be performed in response to receiving a user de-selection of the expanded panel video.

The exemplary video preparation and compositing systems and methods described above allow the relatively fast and scalable compositing of large numbers of video streams whose relative positioning in a video panel array is not readily ascertainable or storable pre-compositing, such as when the components of the video panel array are identified in response to highly-particularized, user-specific video search queries. Video coding steps, and particularly encoding steps, are generally highly computationally intensive. A compositing approach that includes decoding every component video into the pixel domain and re-encoding the resulting composite image as a single stream may allow achieving superior video quality and rate-distortion characteristics for a given bitrate, but would be prohibitively costly computationally for generating large numbers of preview panel array combinations in real time, at 30 frames per second (fps). Such an approach may be well suited if a common video panel array may be generated offline and/or is to be broadcast to a large number of subscribers, e.g. cable TV subscribers, who all receive the same content. Such an approach may not be optimal, however, for a scalable system suitable for displaying video preview panel arrays whose video arrangements are determined dynamically, in real time.

Some of the pre-compositing steps described above, such as transcoding to a common compositing-ready MPEG-2 format, may be relatively computationally intensive, but may be performed at least partially offline and/or using multiple hardware transcoders employed in parallel for different streams. The compressed-domain (transform-domain) compositing step, which depends on the identities and arrangement of the selected preview videos, is relatively computationally inexpensive and can be readily performed in software in a robust, scalable and responsive manner, at 30 fps. The back-end (output) transcoding step may be generally computationally expensive, but is performed only once per preview panel array. In a compositing approach in which input video is decoded to the pixel domain and then re-encoded, the number of transcoder resources needed for one video panel array would be roughly proportional to the number of panels in the video panel array, while in an approach described above, in which off-line pre-compositing preparation of the component videos is coupled with dynamic compositing followed by transcoding only of the composite video, the number of transcoder resources needed for one video panel array is roughly one. System responsiveness is further enhanced by the parallel use of multiple hardware transcoders, each capable of processing multiple video streams.

It will be clear to one skilled in the art that the above embodiments may be altered in many ways without departing from the scope of the invention. Accordingly, the scope of the invention should be determined by the following claims and their legal equivalents.

What is claimed is:
1. A computer system comprising at least one memory connected to at least one processor configured to:

in response to a user video search query, composite a plurality of transcoded video streams in the transform domain into a dynamically-generated composite video stream encoding a preview video panel array responsive to the user video search query, wherein:
  the plurality of transcoded video streams are generated by transcoding a corresponding plurality of independent input video streams, wherein transcoding the plurality of independent input video streams comprises downscaling each of the independent video streams, and
    enforcing a common group-of-picture (GOP) structure across the plurality of transcoded video streams, wherein a GOP structure of the composite video stream coincides with the common GOP structure of the plurality of transcoded video streams, and
  transmit the composite video stream for generating a display of the preview video panel array.

2. The computer system of claim 1, wherein at least one of the input independent video streams includes slices encoding more than one row of video blocks.

3. The computer system of claim 1, wherein the at least one processor is further configured to encapsulate the composite video stream in a container prior to transmitting the composite video stream for generating the display of the preview video panel array.

4. The computer system of claim 1, wherein the at least one processor is further configured to identify a display hardware configuration used to generate the display of the preview video panel array, and to select an array size of the preview video panel array according to the display hardware configuration.

5. The computer system of claim 3, wherein the at least one processor is configured to select the array size of the preview video panel array according to a screen diagonal size.

6. The computer system of claim 1, wherein the at least one processor is further configured to identify a display hardware configuration used to generate the display of the preview video panel array, and to select, according to the display hardware configuration, a pre-constructed video library from a plurality of video libraries, the pre-constructed video library comprising the plurality of input video streams, for retrieving the input video streams from the pre-constructed video library.

7. The computer system of claim 1, wherein the at least one processor is further configured to transmit a plurality of audio streams responsive to the user search query, each audio stream corresponding to one of the panels of the preview video panel array.

8. The computer system of claim 1, wherein the at least one processor is further configured to selectively transmit an audio stream corresponding to a selected panel of the preview video panel array in response to an indicator of a user selection from the preview video panel array of the selected panel.

9. The computer system of claim 1, wherein the preview video panel array shows a loopback display of a predetermined temporal section of each of the input video streams.

10. The computer system of claim 1, wherein the composite video stream is encoded in an H.264 format.

11. A method comprising employing a computer system comprising at least one memory connected to at least one processor to:
  in response to a user video search query, composite a plurality of transcoded video streams in the transform domain into a dynamically-generated composite video stream encoding a preview video panel array responsive to the user video search query, wherein:
    the plurality of transcoded video streams are generated by transcoding a corresponding plurality of independent input video streams, wherein transcoding the plurality of independent input video streams comprises downscaling each of the independent video streams, and
      enforcing a common group-of-picture (GOP) structure across the plurality of transcoded video streams, wherein a GOP structure of the composite video stream coincides with the common GOP structure of the plurality of transcoded video streams, and
  transmit the composite video stream for generating a display of the preview video panel array.

12. A computer system comprising:
  means for, in response to a user video search query, compositing a plurality of transcoded video streams in the transform domain into a dynamically-generated composite video stream encoding a preview video panel array responsive to the user video search query, wherein:
    the plurality of transcoded video streams are generated by transcoding a corresponding plurality of independent input video streams, wherein transcoding the plurality of independent input video streams comprises downscaling each of the independent video streams, and
      enforcing a common group-of-picture (GOP) structure across the plurality of transcoded video streams, wherein a GOP structure of the composite video stream coincides with the common GOP structure of the plurality of transcoded video streams, and
  means for transmitting the composite video stream for generating a display of the preview video panel array.

* * * * *